(12) United States Patent
Shen et al.

(10) Patent No.: US 11,974,277 B2
(45) Date of Patent: Apr. 30, 2024

(54) RESOURCE ALLOCATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Jia Shen, Guangdong (CN); Zhenshan Zhao, Guangdong (CN); Yanan Lin, Guangdong (CN); Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 615 days.

(21) Appl. No.: 17/158,280

(22) Filed: Jan. 26, 2021

(65) Prior Publication Data

US 2021/0176742 A1   Jun. 10, 2021

Related U.S. Application Data

(63) Continuation of application No. PCT/CN2018/098562, filed on Aug. 3, 2018.

(51) Int. Cl.
*H04W 72/20* (2023.01)
*H04L 5/00* (2006.01)
*H04W 72/044* (2023.01)

(52) U.S. Cl.
CPC ........... *H04W 72/20* (2023.01); *H04L 5/0048* (2013.01); *H04W 72/044* (2013.01)

(58) Field of Classification Search
CPC .......................... H04W 72/20; H04W 72/044
USPC ........................................................ 370/329
See application file for complete search history.

(56) References Cited

FOREIGN PATENT DOCUMENTS

| CN | 101841773 A | 9/2010 |
|---|---|---|
| CN | 101984719 A | 3/2011 |
| CN | 103037511 A | 4/2013 |
| CN | 108289339 A | 7/2018 |

OTHER PUBLICATIONS

International Search Report dated Apr. 28, 2019 of PCT/CN2018/098562 (4 pages).

(Continued)

*Primary Examiner* — Angel T Brockman
(74) *Attorney, Agent, or Firm* — PERKINS COIE LLP

(57) ABSTRACT

Implementations of the present disclosure relate to a resource allocation method, a terminal device, and a network device. The method comprises: receiving first configuration information transmitted by a network device, wherein the first configuration information comprises multiple resource collections, the multiple resource collections are in one-to-one correspondence with multiple RNTIs, each of the multiple resource collections is used for indicating an available resource of a target channel, and the available resources indicated by the multiple resource collections are different; receiving target downlink control information (DCI) transmitted by the network device; and if the target DCI is scrambled according to a first RNTI among the multiple RNTIs, determining a resource used by the target channel in a first resource collection corresponding to the first RNTI.

20 Claims, 6 Drawing Sheets

300

Send first configuration information to a terminal device, wherein the first configuration information includes multiple resource collections which are in one-to-one correspondence with multiple RNTIs, each of the multiple resource collections is used for indicating an available resource of a target channel of the terminal device, and available resources indicated by the multiple resource collections are different — S310

Send target DCI to the terminal device, wherein if the target DCI is scrambled according to a first RNTI among the multiple RNTIs, the first RNTI is used for the terminal device to determine a resource to be used by the target channel in the first resource collection corresponding to the first RNTI — S320

(56) References Cited

OTHER PUBLICATIONS

Catt "Remaining issues on PDSCH/PUSCH resource allocation" R1-1803757; 3GPP TSG RAN WG1 Meeting #92bis; Sanya, China; Apr. 16-20, 2018. 8 pages.
EPO, Extended European Search Report for European Application No. 18928834.3, dated Jul. 7, 2021. 9 pages.
Ericsson "Remaining issues of UL/DL Resource Allocation" Tdoc R1-1807412; 3GPP TSG-RAN WG1 Meeting #93; Busan, South Korea, May 21-25, 2018. 13 pages.

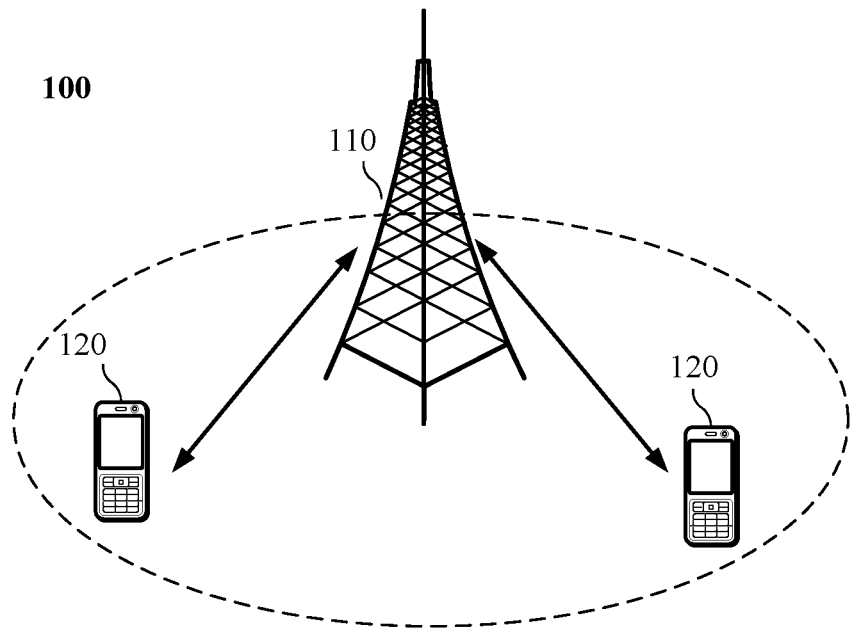

Receive first configuration information sent by a network device, wherein the first configuration information includes multiple resource collections, the multiple resource collections are in one-to-one correspondence with multiple RNTIs, each of the multiple resource collections is used for indicating an available resource of a target channel, and available resources indicated by the multiple resource collections are different — S210

Receive target downlink control information (DCI) sent by the network device — S220

If the target DCI is scrambled according to a first RNTI among the multiple RNTIs, determine a resource to be used by the target channel in a first resource collection corresponding to the first RNTI — S230

Send first configuration information to a terminal device, wherein the first configuration information includes multiple resource collections which are in one-to-one correspondence with multiple RNTIs, each of the multiple resource collections is used for indicating an available resource of a target channel of the terminal device, and available resources indicated by the multiple resource collections are different ⏤ S310

Send target DCI to the terminal device, wherein if the target DCI is scrambled according to a first RNTI among the multiple RNTIs, the first RNTI is used for the terminal device to determine a resource to be used by the target channel in the first resource collection corresponding to the first RNTI ⏤ S320

FIG. 3

RESOURCE ALLOCATION METHOD, TERMINAL DEVICE, AND NETWORK DEVICE

CROSS-REFERENCE TO RELATED APPLICATION

This application is a continuation application of International Application No. PCT/CN2018/098562 filed on Aug. 3, 2018, of which the entire disclosure is hereby incorporated by reference.

TECHNICAL FIELD

The present disclosure relates to the field of communication, in particular, to a resource allocation method, a terminal device, and a network device.

BACKGROUND

In the existing 5G New Radio (NR) system, a resource allocation method of time domain resource at a symbol level of a Physical Downlink Shared Channel (PDSCH) and a Physical Uplink Shared Channel (PUSCH) is to firstly configure a table containing 16 start and length indicator values (SLIVs) through Radio Resource Control (RRC), and then indicate a SLIV value from the table through Downlink Control Information (DCI).

According to a resource allocation method of a Physical Uplink Control Channel (PUCCH) in a 5G NR system, a resource set containing 32 PUCCH resources is first configured through RRC, and then a PUCCH resource is determined therefrom through an implicit mapping relationship between the DCI and Control Channel Element (CCE).

No matter for a NR-PDSCH, a NR-PUSCH or a NR-PUSCH, in order to control DCI overhead, sizes of a PDSCH/PUSCH time domain resource table and a PUSCH resource set are very limited. For example, the PDSCH/PUSCH time domain resource table only contains 16 SLIV values, and the PUSCH resource set can contain only 32 PUSCH resources at most. However, a PDSCH/PUSCH time domain resource or a PUSCH resource needs to contain many dimensional parameters. For example, a PDSCH/PUSCH time domain resource needs to contain three dimensional parameters, namely, a starting symbol, a quantity of symbols and PDSCH/PUSCH mapping types, while a PUSCH resource contains more parameters. Therefore, optional values in each dimension are very limited, which greatly limit flexibility of scheduling and efficiency of resource allocation, and are unfavorable to low-latency transmissions of Ultra Reliable & Low Latency Communication (URLLC) services.

SUMMARY

Implementations of the present disclosure provide a resource allocation method, a terminal device and a network device.

In a first aspect, a resource allocation method is provided, which includes: receiving first configuration information sent by a network device, wherein the first configuration information includes multiple resource collections which are in one-to-one correspondence with multiple Radio Network Temporary Identities (RNTIs), each of the multiple resource collections is used for indicating an available resource of a target channel, and available resources indicated by the multiple resource collections are different; receiving target DCI sent by the network device; and if the target DCI is scrambled according to a first RNTI among the multiple RNTIs, determining a resource to be used by the target channel in a first resource collection corresponding to the first RNTI.

In a second aspect, a resource allocation method is provided, which includes: sending first configuration information to a terminal device, wherein the first configuration information includes multiple resource collections which are in one-to-one correspondence with multiple RNTIs, each of the multiple resource collections is used for indicating an available resource of a target channel of the terminal device, and available resources indicated by the multiple resource collections are different; sending target downlink control information (DCI) to the terminal device, wherein if the target DCI is scrambled according to a first RNTI among the multiple RNTIs, the first RNTI is used for the terminal device to determine a resource to be used by the target channel in the first resource collection corresponding to the first RNTI.

In a third aspect, a terminal device is provided for implementing the method in the first aspect or various implementations thereof. Specifically, the terminal device includes a functional module for implementing the method in the first aspect or various implementations thereof.

In a fourth aspect, a network device is provided for implementing the method in the second aspect or various implementations thereof. Specifically, the terminal device includes a functional module for implementing the method in the second aspect or various implementations thereof.

In a fifth aspect, a terminal device is provided. The terminal device includes a processor and a memory. The memory is used for storing a computer program, and the processor is used for calling and running the computer program stored in the memory to perform the method in the first aspect or various implementations thereof.

In a sixth aspect, a network device is provided. The network device includes a processor and a memory. The memory is used for storing a computer program, and the processor is used for calling and running the computer program stored in the memory to perform the method in the second aspect or various implementations thereof.

In a seventh aspect, a chip is provided for implementing the method in any one of the first to second aspects or various implementations thereof. Specifically, the chip includes a processor for calling and running a computer program from a memory, so that a device mounted with the chip performs the method in any one of the first to second aspects or various implementations thereof.

In an eighth aspect, a computer-readable storage medium is provided for storing a computer program that causes a computer to perform the method in any one of the first to second aspects or various implementations thereof.

In a ninth aspect, a computer program product is provided. The computer program product comprises a computer program instruction that causes a computer to perform the method in any one of the first to second aspects or various implementations thereof.

In a tenth aspect, a computer program is provided. When being run on a computer, the computer program causes the computer to perform the method in any one of the first to second aspects or various implementations thereof.

BRIEF DESCRIPTION OF DRAWINGS

FIG. 1 is a schematic diagram of an architecture of a communication system according to an implementation of the present disclosure.

FIG. 2 is a schematic flow chart of a resource allocation method according to an implementation of the present disclosure.

FIG. 3 is another schematic flow chart of a resource allocation method according to an implementation of the present disclosure.

DETAILED DESCRIPTION

Figure 4:
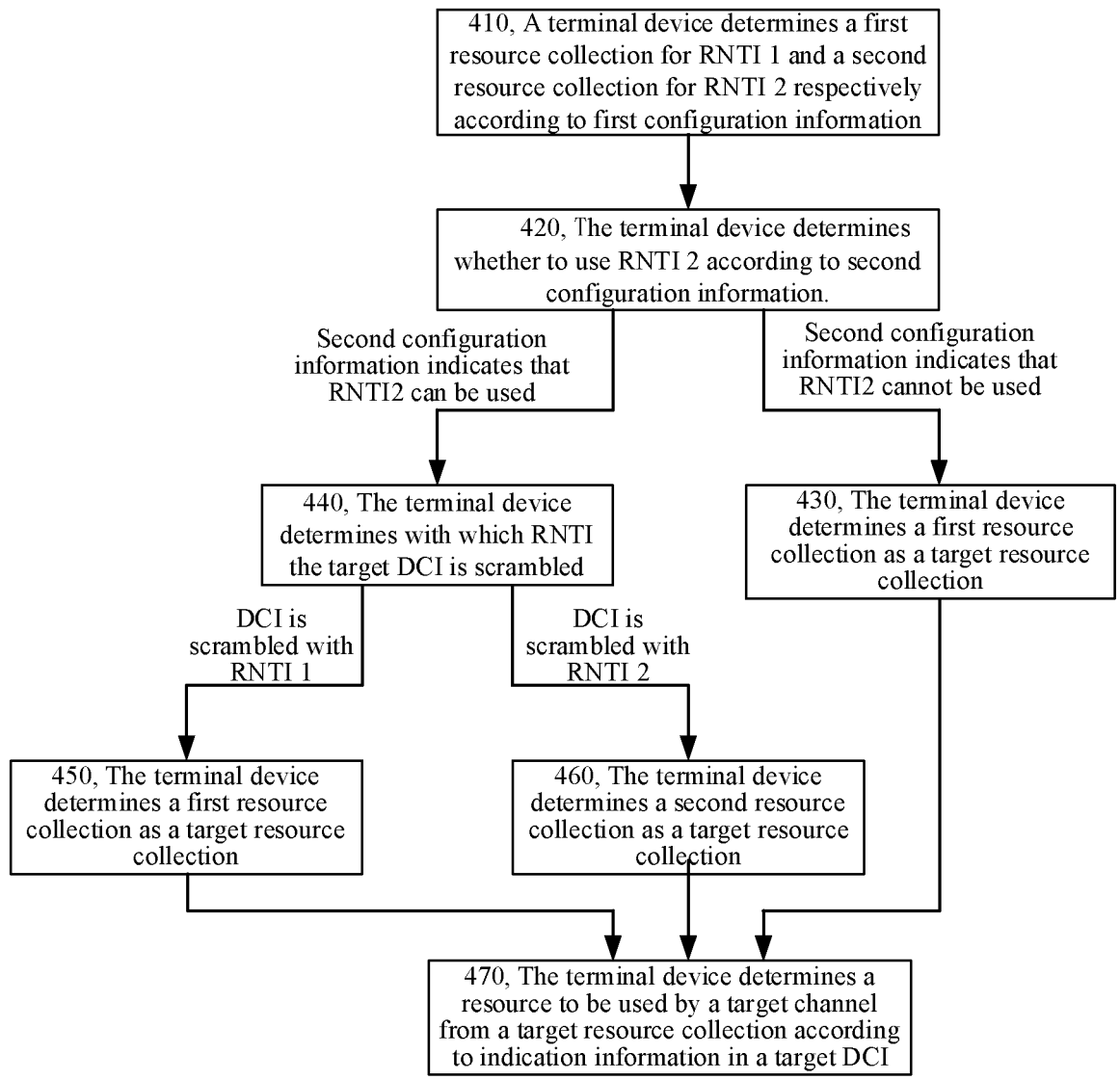
FIG. 4 is yet another schematic flow chart of a resource allocation method according to an implementation of the present disclosure.

Technical solutions in implementations of the present disclosure will be described below with reference to the drawings in the implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system.

Illustratively, a communication system 100 applied in an implementation of the present disclosure is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal device 120 located within the coverage area of the network device 110. As used herein, the term "terminal device" includes, but not limited to, a device configured to connect via a wired circuit, for example, via a Public Switched Telephone Network (PSTN), a Digital Subscriber Line (DSL), a digital cable, a direct cable; and/or another data connection/network, and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another terminal device, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of being combined with a cellular wireless telephone and data processing, faxing and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or other electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing device connected to a wireless modem, a vehicle-mounted device, a wearable device, a terminal device in a 5G network, or a terminal device in a future evolved Public Land Mobile Network (PLMN), or the like.

Optionally, a device to device (D2D) communication may be performed between the terminal devices 120.

Optionally, the 5G system or 5G network may be referred to as a New Radio (NR) system or a NR network.

FIG. 1 shows one network device and two terminal devices as an example. Optionally, the communication system 100 may include multiple network devices, and other quantity of terminal devices may be included within a coverage area of each network device, which is not limited in implementations of the present disclosure.

Optionally, the communication system 100 may include other network entities such as a network controller, and a mobile management entity, which are not limited in implementations of the present disclosure.

It should be understood that, a device with a communication function in a network/system in an implementation of the present disclosure may be referred to as a communication device. Taking the communication system 100 shown in FIG. 1 as an example, the communication device may include a network device 110 and a terminal device 120 which have communication functions, and the network device 110 and the terminal device 120 may be specific devices described above, which will not be described here again. The communication device may also include other devices in the communication system 100, such as a network controller, a mobile management entity of other network entities, which are not limited in implementations of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

FIG. 2 is a schematic flow chart of a resource allocation method 200 according to an implementation of the present disclosure. The method 200 may be implemented by a terminal device, such as the terminal device shown in FIG. 1. As shown in FIG. 2, the method 200 includes acts S210 to S230.

In S210, receiving first configuration information sent by a network device, wherein the first configuration information includes multiple resource collections, the multiple resource collections are in one-to-one correspondence with multiple RNTIs, each of the multiple resource collections is used for indicating an available resource of a target channel, and available resources indicated by the multiple resource collections are different;

In S220, receiving target downlink control information (DCI) sent by the network device; and In S230, if the target DCI is scrambled according to a first RNTI among the multiple RNTIs, determining a resource to be used by the target channel in a first resource collection corresponding to the first RNTI.

Specifically, in S210, the terminal device receives first configuration information sent by a network device, the first configuration information includes multiple resource collections, the multiple resource collections are in one-to-one correspondence with multiple RNTIs, each of the multiple resource collections is used for indicating an available resource of a target channel, and available resources indicated by the multiple resource collections are different. The target channel may be a PUSCH or PDSCH, and correspondingly, each resource collection is a resource allocation table. Or, the target channel may be a PUCCH, and correspondingly, each resource collection is a resource set.

Optionally, as an implementation, if the target channel is a PUSCH or PDSCH, then correspondingly, each resource collection is a resource allocation table, and each resource allocation table may include a resource parameter for at least one available resource of the PUSCH or PDSCH. For example, the at least one available resource may refer to an available time domain resource. Taking a first available resource as an example, the first available resource is any one of the at least one available resource included in the resource allocation table, and the resource parameter of the first available resource may include at least one of the following parameters: a starting symbol of the first available resource, a length of the first available resource and a mapping type of the first available resource. Different mapping types may refer to different time-domain positions of a demodulation reference signal (DMRS). For example, the mapping type may include a first mapping and a second mapping type, the first mapping type refers to that a time-domain position of the DMRS is indicated relative to a starting point of a time slot, and a second mapping type refers to that a time-domain position of the DMRS is indicated relative to a starting point of a PUSCH or PDSCH.

Optionally, as an implementation, if the target channel is a PUCCH, then correspondingly, each resource collection is a resource set. Each resource set may include a resource parameter for at least one available resource of the PUCCH. For example, the at least one available resource may refer to an available time domain resource. Taking a second available resource as an example, the second available resource is any one of the at least one available resource included in the resource set, and the resource parameter of the second available resource may include at least one of the following parameters: a starting symbol, a quantity of symbols, a starting physical resource block (PRB), a PRB of a second hop, a quantity of PRBs, whether to perform frequency hopping, an index of an initial cyclic shift, an index of an orthogonal cover code (OCC), and a length of the OCC of the second available resource.

It should be understood that the terminal device receives the first configuration information sent by the network device, the first configuration information includes multiple resource collections, and the multiple resource collections are in one-to-one correspondence with multiple RNTIs. For convenience of explanation, here, a first resource collection and a second resource collection included in the first configuration information are taken as examples. The first resource collection corresponds to a first RNTI and the second resource collection corresponds to a second RNTI, and both of the first resource collection and the second resource collection correspond to available resources of the target channel, and an available resource indicated by the first resource collection is different from that indicated by the second resource collection.

For example, taking the target channel being a PUSCH or PDSCH as an example, the terminal device receives the first configuration information sent by the network device, the first configuration information includes a first resource allocation table corresponding to the first RNTI (RNTI 1) as shown in Table 1 and a second resource allocation table corresponding to the second RNTI (RNTI 2) as shown in Table 2. Parameters corresponding to available resources indicated by the two resource allocation tables are shown in Tables 1 and 2 respectively.

TABLE 1

First resource allocation table corresponding to RNTI 1

| Resource index | Mapping type | Starting symbol | Length (quantity of symbols) |
|---|---|---|---|
| 0 | Type A | Symbol 0 | 2 symbols |
| 1 | | | 4 symbols |
| 2 | | | 7 symbols |
| 3 | | | 10 symbols |
| 4 | | Symbol 2 | 2 symbols |
| 5 | | | 4 symbols |
| 6 | | | 7 symbols |
| 7 | | | 10 symbols |
| 8 | Type B | Symbol 0 | 2 symbols |
| 9 | | | 4 symbols |
| 10 | | | 7 symbols |
| 11 | | | 10 symbols |
| 12 | | Symbol 2 | 2 symbols |
| 13 | | | 4 symbols |
| 14 | | | 7 symbols |
| 15 | | | 10 symbols |

TABLE 2

Second resource allocation table corresponding to RNTI 2

| Resource index | Mapping type | Starting symbol | Length (quantity of symbols) |
|---|---|---|---|
| 0 | Type A | Symbol 0 | 2 symbols |
| 1 | | | 4 symbols |
| 2 | | Symbol 3 | 2 symbols |
| 3 | | | 4 symbols |
| 4 | | Symbol 7 | 2 symbols |
| 5 | | | 4 symbols |
| 6 | | Symbol 10 | 2 symbols |
| 7 | | | 4 symbols |
| 8 | Type B | Symbol 0 | 2 symbols |
| 9 | | | 4 symbols |
| 10 | | Symbol 3 | 2 symbols |
| 11 | | | 4 symbols |
| 12 | | Symbol 7 | 2 symbols |
| 13 | | | 4 symbols |
| 14 | | Symbol 10 | 2 symbols |
| 15 | | | 4 symbols |

Type A and type B may correspond to two different mapping types, for example, type A may correspond to a first mapping type, and type B may correspond to a second mapping type, which are not limited in implementations of the present disclosure.

It should be understood that, in theory, starting symbols may be from 0 to 13, with 14 options at most, and a quantity of symbols may be from 1 to 14, with 14 options at most, too. But in practice, there can be only several options in each resource allocation table, with very limited options. However, allocating multiple resource allocation tables has greatly improved scheduling flexibility compared with allocating only one resource allocation table.

Specifically, according to Table 1 and Table 2, it can be seen that the two resource allocation tables are not exactly identical. Herein, each resource allocation table indicates the same quantity of available resources, that is, each indicates 16 available resources. Alternatively, it may be configured that the two resource allocation tables include different quantities of available resources.

Each of the first resource allocation table configured for RNTI 1 and the second resource allocation table configured for RNTI 2 includes two mapping types. The first resource allocation table configured for RNTI 1 includes two optional starting symbols and four optional quantities of symbols, which has greater flexibility in length and is more suitable for a longer PDSCH/PUSCH transmission, such as an eMBB service. The second resource allocation table configured for RNTI 2 includes four optional starting symbols and two optional quantities of symbols, which has greater flexibility in starting symbols and is more suitable for a shorter PDSCH/PUSCH transmission with a variable location, such as a URLLC service.

For another example, still taking the target channel being a PUSCH or PDSCH as an example, the terminal device receives the first configuration information sent by the network device, the first configuration information includes the first resource allocation table corresponding to the first RNTI (RNTI 1) as shown in Table 3 and the second resource allocation table corresponding to the second RNTI (RNTI 2) as shown in Table 4. Parameters corresponding to available resources indicated by the two resource allocation tables are shown in Tables 3 and 4 respectively.

TABLE 3

First resource allocation table corresponding to RNTI 1

| Resource index | Mapping type | Starting symbol | Length (quantity of symbols) |
|---|---|---|---|
| 0 | Type A | Symbol 0 | 1 symbol |
| 1 | | | 2 symbols |
| 2 | | | 4 symbols |
| 3 | | | 6 symbols |
| 4 | | | 8 symbols |
| 5 | | | 10 symbols |
| 6 | | | 12 symbols |
| 7 | | | 14 symbols |
| 8 | | Symbol 2 | 2 symbols |
| 9 | | | 4 symbols |
| 10 | | | 7 symbols |
| 11 | | | 10 symbols |
| 12 | | Symbol 4 | 2 symbols |
| 13 | | | 4 symbols |
| 14 | | | 7 symbols |
| 15 | | | 10 symbols |

TABLE 4

Second resource allocation table corresponding to RNTI 2

| Resource index | Mapping type | Starting symbol | Length (quantity of symbols) |
|---|---|---|---|
| 0 | Type B | Symbol 0 | 1 symbol |
| 1 | | | 2 symbols |
| 2 | | | 4 symbols |
| 3 | | Symbol 2 | 1 symbol |
| 4 | | | 2 symbols |
| 5 | | | 4 symbols |
| 6 | | Symbol 4 | 1 symbol |
| 7 | | | 2 symbols |
| 8 | | | 4 symbols |
| 9 | | Symbol 6 | 1 symbol |
| 10 | | | 2 symbols |
| 11 | | | 4 symbols |
| 12 | | Symbol 8 | 1 symbol |
| 13 | | | 2 symbols |
| 14 | | | 4 symbols |
| 15 | | Symbol 10 | 1 symbol |

Type A and type B may correspond to two different mapping types, for example, type A may correspond to the first mapping type, and type B may correspond to the second mapping type, which are not limited in implementations of the present disclosure.

It should be understood that in Table 3 and Table 4, the two resource allocation tables are not exactly identical. Herein, each resource allocation table indicates the same quantity of available resources, that is, each indicates 16 available resources. Alternatively, it may be arranged that the two resource allocation tables include different quantities of available resources.

Specifically, a difference of this implementation from the previous implementation is that each of the first resource allocation table configured for RNTI 1 and the second resource allocation table configured for RNTI 2 includes one mapping type, in which the first resource allocation table is completely of resources of the first mapping type of the PDSCH/PUSCH, that is, resources of the mapping type A, and the second resource allocation table is completely of resources of the second mapping type of the PDSCH/PUSCH, that is, resources of the mapping type B. Similarly, the first resource allocation table configured for RNTI 1 as shown in Table 3 has greater flexibility in length, and is more suitable for a longer PDSCH/PUSCH transmission, such as an eMBB service. The second resource allocation table configured for RNTI 2 as shown in Table 4 has greater flexibility in a starting symbol, and is more suitable for a shorter PDSCH/PUSCH transmission with a variable location, such as a URLLC service.

For another example, taking the target channel being a PUCCH as an example, the terminal device receives the first configuration information sent by the network device, the first configuration information includes a first resource set corresponding to the first RNTI (RNTI 1) as shown in Table 5 and a second resource set corresponding to the second RNTI (RNTI 2) as shown in Table 6. As there are many parameters included in each resource set, which are impossible to be listed in detail, the parameters are replaced by resource coding as shown in Table 5 and Table 6 respectively.

TABLE 5

First resource set of PUCCH corresponding to RNTI 1

| PUCCH resource index |
| --- |
| PUCCH resource #1-0 |
| PUCCH resource #1-1 |
| PUCCH resource #1-2 |
| . . . |
| PUCCH resource #1-31 |

TABLE 6

Second resource set of PUCCH corresponding to RNTI 2

| PUCCH resource index |
| --- |
| PUCCH resource #2-0 |
| PUCCH resource #2-1 |
| PUCCH resource #2-2 |
| . . . |
| PUCCH resource #2-31 |

The available resources indicated by the two resource sets in Table 5 and Table 6 are not exactly identical. Herein, each resource set indicates the same quantity of available resources, that is, each indicates 32 available resources. Alternatively, it may be configured that the two resource sets include different quantities of available resources. Furthermore, each index in each resource set represents an available resource, and at least one parameter is different between available resources represented by different indexes in the same resource set. For example, lengths of two available resources represented by PUCCH resources #1-2 and PUCCH resources #1-14 in Table 5 are different, which are not limited in implementations of the present disclosure.

It should be understood that if the first resource set has greater flexibility in length, it is more suitable for a longer PUCCH transmission, for example, it is more suitable for an uplink feedback of an eMBB service; and if the second resource set has greater flexibility in a starting symbol, it is more suitable for a shorter PUCCH transmission with a variable location, for example, it is more suitable for an uplink feedback of a URLLC service.

In S220, the terminal device receives target DCI sent by the network device and determines a RNTI for scrambling the target DCI.

In S230, if it is determined that the target DCI is scrambled according to the first RNTI among the multiple RNTIs, the terminal device determines a resource to be used by the target channel in the first resource set corresponding to the first RNTI. Specifically, multiple resource collections in one-to-one correspondence with multiple RNTIs are configured in the first configuration information received by the terminal device, and the terminal device determines whether the received target DCI is scrambled according to the first RNTI among the multiple RNTIs. If the target DCI is scrambled according to the first RNTI, the resource to be used by the target channel is determined in the first resource collection corresponding to the first RNTI. If it is determined that the target DCI is not scrambled according to the first RNTI, for example, the target DCI is scrambled according to the second RNTI among the multiple RNTIs, the terminal device determines the resource to be used by the target channel in the second resource collection corresponding to the second RNTI.

It should be understood that the target DCI may be DCI for scheduling a downlink resource or DCI for scheduling an uplink resource, which are not limited in implementations of the present disclosure.

It should be understood that the first RNTI may be a Cell Radio Network Temporary Identifier (C-RNTI). Or, the first RNTI may be another RNTI other than the C-RNTI, which is similar to the C-RNTI and may be used to scramble DCI for scheduling data. The second RNTI is any RNTI different from the first RNTI, for example, the first RNTI is C-RNTI and the second RNTI is another RNTI, which are not limited in implementations of the present disclosure.

For convenience of explanation, assuming that the multiple RNTIs include a first RNTI and a second RNTI, herein the first RNTI may be a C-RNTI and the second RNTI is another RNTI. Optionally, as an implementation, before receiving the target DCI sent by the network device, the method 200 may further include: receiving second configuration information sent by the network device, herein the second configuration information is used for indicating whether to monitor DCI scrambled with the second RNTI among the multiple RNTIs, so that the terminal device may determine whether to monitor DCI scrambled with the second RNTI according to the second configuration information.

Specifically, determining, by the terminal device, whether to monitor the DCI scrambled with the second RNTI according to the second configuration information, includes: if the second configuration information is a first value, the second configuration information is used for indicating to monitor the DCI scrambled with the second RNTI, that is, the terminal device determines to monitor the DCI scrambled with the second RNTI; and if the second configuration information is a second value, the second configuration information is used for indicating not to monitor the DCI scrambled with the second RNTI, that is, the terminal device determines not to monitor the DCI scrambled with the second RNTI.

Optionally, if the second indication information indicates to the terminal device not to monitor the DCI scrambled with the second RNTI, the terminal device may determine not to monitor the DCI scrambled with the second RNTI according to the second indication information, and at the same time, the terminal device will determine a resource to be used by the target channel in the first resource collection corresponding to the first RNTI.

Optionally, if the second indication information indicates to the terminal device to monitor the DCI scrambled with the second RNTI, the terminal device may determine to monitor the DCI scrambled with the second RNTI according to the second indication information. Specifically, when receiving the target DCI, the terminal device determines whether a RNTI scrambling the target DCI is the first RNTI or the second RNTI. If the target DCI is scrambled according to the first RNTI, the terminal device determines a resource to be used by the target channel in the first resource collection corresponding to the first RNTI. If the target DCI is scrambled according to the second RNTI, the terminal device determines a resource to be used by the target channel in the second resource collection corresponding to the second RNTI.

Optionally, the method 200 further includes: if the target DCI is scrambled according to the first RNTI, the terminal device determines a target resource in the first resource collection corresponding to the first RNTI according to the indication information in the target DCI, and the target resource is a resource to be used by the target channel. Specifically, assuming that the target DCI is scrambled according to the first RNTI, the target DCI may include indication information for indicating a target resource, and the terminal device determines the target resource in the first resource collection corresponding to the first RNTI according to the indication information. For example, the first resource collection may be the first resource allocation table shown in Table 1, then the terminal device determines, according to the indication information, that the target resource is a resource to be used by the PUSCH or PDSCH among the 16 available resources shown in Table 1.

Therefore, the resource allocation method of the implementation of the present disclosure may configure different resource collections for DCI scrambled with different RNTI respectively, so as to dynamically allocate different time-frequency domain resources according to different types of services without consuming DCI overhead, thereby optimizing resource allocation for eMBB and URLLC services respectively, reducing a transmission delay of a URLLC, improving resource utilization of the system, and better supporting one terminal device to run eMBB and URLLC services at the same time.

The resource allocation method according to the implementation of the present disclosure is described in detail from a perspective of the terminal device above in combination with FIGS. 1 to 2, and a resource allocation method according to an implementation of the present disclosure will be described in detail from a perspective of a network device below in combination with FIG. 3.

FIG. 3 is a schematic flow chart of a resource allocation method 300 according to an implementation of the present disclosure. The method 300 may be implemented by the network device shown in FIG. 1. As shown in FIG. 3, the method 300 includes acts S310 and S320.

In S310, sending first configuration information to a terminal device, wherein the first configuration information includes multiple resource collections which are in one-to-one correspondence with multiple RNTIs, each of the multiple resource collections is used for indicating an available resource of a target channel of the terminal device, and available resources indicated by the multiple resource collections are different; and In S320, sending target DCI to the terminal device, wherein if the target DCI is scrambled according to a first RNTI among the multiple RNTIs, the first RNTI is used for the terminal device to determine a resource to be used by the target channel in the first resource collection corresponding to the first RNTI.

Optionally, as an implementation, the target DCI includes indication information, the indication information is used for the terminal device to determine that a target resource in the first resource collection is the resource to be used by the target channel.

Optionally, as an implementation, the target channel is a PUSCH or PDSCH, and each resource collection is a resource allocation table.

Optionally, as an implementation, each resource collection includes a resource parameter of at least one available resource of the PUSCH or PDSCH, and the resource parameter of a first available resource among the at least one available resource includes at least one of the following parameters: a starting symbol of the first available resource, a length of the first available resource and a mapping type of the first available resource. Mapping types include a first mapping type and a second mapping type. The first mapping type is that a time-domain position of a demodulation reference signal (DMRS) is indicated relative to a starting point of a time slot, and the second mapping type is that a time-domain position of the DMRS is indicated relative to a starting point of the PUSCH or PDSCH.

Optionally, as an implementation, the target channel is a PUCCH, and each resource collection is a resource set.

Optionally, as an implementation, each resource collection includes a resource parameter of at least one available resource of the PUCCH, and the resource parameter of a second available resource among the at least one available resource includes at least one of the following parameters: a starting symbol, a quantity of symbols, a starting physical resource block (PRB), a PRB of a second hop, a quantity of PRBs, whether to perform frequency hopping, an index of an initial cyclic shift, an index of an OCC, and a length of the OCC of the second available resource.

Optionally, as an implementation, the first RNTI is a C-RNTI.

Optionally, as an implementation, before sending the target downlink control information (DCI) to the terminal device, the method 300 further includes: sending second configuration information to the terminal device, wherein the second configuration information indicates to the terminal device whether to monitor DCI scrambled with a second RNTI among the multiple RNTIs.

Optionally, as an implementation, the second configuration information indicates to the terminal device to monitor the DCI scrambled with the second RNTI, and if the target DCI is scrambled according to the second RNTI, the second RNTI is used for the terminal device to determine a resource to be used by the target channel in the second resource collection corresponding to the second RNTI.

Optionally, as an implementation, the second configuration information indicates to the terminal device not to monitor the DCI scrambled with the second RNTI, and the first RNTI is used for the terminal device to determine that the target DCI is scrambled according to the first RNTI.

Optionally, as an implementation, if the second configuration information is a first value, the second configuration information indicates to the terminal device to monitor the DCI scrambled with the second RNTI; and if the second configuration information is a second value, the second configuration information indicates to the terminal device not to monitor the DCI scrambled with the second RNTI.

It should be understood that an executing subject in the method 300 may be a network device, and the network device may correspond to the network device in method 200, and the terminal device in method 300 may correspond to the terminal device in method 200, which will not be described here for brevity.

Therefore, the resource allocation method of the implementation of the present disclosure may configure different resource collections for DCI scrambled with different RNTIs respectively, so as to dynamically allocate different time-frequency domain resources according to different types of services without consuming DCI overhead, thereby optimizing resource allocations for eMBB and URLLC services respectively, reducing a transmission delay of a URLLC, improving resource utilization of the system, and better supporting one terminal device to run eMBB and URLLC services at the same time.

The resource allocation method according to the implementations of the present disclosure will be described below with reference to a specific implementation.

FIG. 4 is a schematic flow chart of a resource allocation method 400 according to an implementation of the present disclosure. As shown in FIG. 4, the method 400 includes following acts S410 to S470.

In S410, a terminal device determines a first resource collection for RNTI 1 and a second resource collection for RNTI 2 respectively according to first configuration information.

Specifically, S410 may correspond to S210 in method 200, which will not be described in detail herein. assuming the terminal device receives the first configuration information sent by a network device, and the first configuration information includes two resource collections, the two resources are a first resource collection for RNTI 1 and a second resource collection for RNTI 2, respectively, and the two resource collections may correspond to the multiple resource collections in method 200.

Optionally, both of the two resource collections may be resource allocation tables. For example, the two resource collections may correspond to the two resource allocation tables shown in Table 1 and Table 2 in method 200 above, or the two resource allocation tables shown in Table 3 and Table 4 above. Or, the two resource collections may be uniform resource sets, for example, the two resource collections may correspond to the two resource sets shown in Table 5 and Table 6 above.

In S420, the terminal device determines whether to use RNTI 2 according to second configuration information.

Specifically, the terminal device receives the second configuration information sent by the network device, and the second configuration information is used for indicating to the terminal device whether to monitor DCI scrambled with RNTI 2. If the second configuration information indicates to the terminal device not to use RNTI 2, that is, not to monitor the DCI scrambled with RNTI 2, continue to perform S430, and if the second configuration information indicates to the terminal device to use RNTI 2, that is, to monitor the DCI scrambled with RNTI 2, continue to perform S440.

In S430, the terminal device determines a first resource collection as the target resource collection.

The second configuration information indicates to the terminal device not to use RNTI 2, the terminal device does not monitor the DCI scrambled with RNTI 2, and determines the first resource collection corresponding to RNTI 1 as the target resource collection.

In S440, the terminal device determines with which RNTI the target DCI is scrambled.

According to the second configuration information, the terminal device determines that RNTI 2 may be used, that is, the terminal device may detect the DCI scrambled with RNTI 2, then the terminal device receives the target DCI sent by the network device and determines with which RNTI the target DCI is scrambled. If the target DCI is scrambled according to RNTI 1, continue to perform S450, and if the target DCI is scrambled according to RNTI 2, continue to perform S460.

In S450, the terminal device determines the first resource collection as the target resource collection.

The terminal device determines that the received target DCI is scrambled according to RNTI 1, the terminal device determines the first resource collection corresponding to RNTI 1 as the target resource collection.

In S460, the terminal device determines a second resource collection as the target resource collection.

The terminal device determines that the received target DCI is scrambled according to RNTI 2, the terminal device determines the second resource collection corresponding to RNTI 2 as the target resource collection.

In S470, the terminal device determines a resource to be used by the target channel from the target resource collection according to indication information in the target DCI.

According to the above acts, the terminal device determines the first resource collection or the second resource collection as the target resource collection, and then determines a resource to be used by the target channel from the target resource collection according to the indication information in the target DCI.

For example, if the terminal device determines the first resource collection as the target resource collection, the terminal device determines a resource to be used by the target channel in the first resource collection according to the indication information in the target DCI.

It should be understood that method 400 is a specific implementation of the above method 200 and method 300. The network device in method 400 may correspond to the network device in method 200 and method 300, and the terminal device in method 400 may correspond to the terminal device in method 200 and method 300.

Therefore, the resource allocation method of the implementation of the present disclosure may configure different resource collections for DCI scrambled with different RNTIs respectively, so as to dynamically allocate different time-frequency domain resources according to different types of services without consuming DCI overhead, thereby optimizing resource allocations for eMBB and URLLC services respectively, reducing a transmission delay of a URLLC, improving resource utilization of the system, and better supporting one terminal device to run eMBB and URLLC services at the same time.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

In addition, the term "and/or" in this document describes only an association relationship for describing associated objects and represents that three relationships may exist. For example, A and/or B may represent the following three cases: Only A exists, both A and B exist, and only B exists. In addition, the symbol "/" in this document generally indicates that objects before and after the symbol "/" have an "or" relationship.

The resource allocation method according to the implementations of the present disclosure is described in detail above with reference to FIG. 1 to FIG. 4. A terminal device and a network device according to implementations of the present disclosure will be described below with reference to FIG. 5 to FIG. 6.

Figure 5:
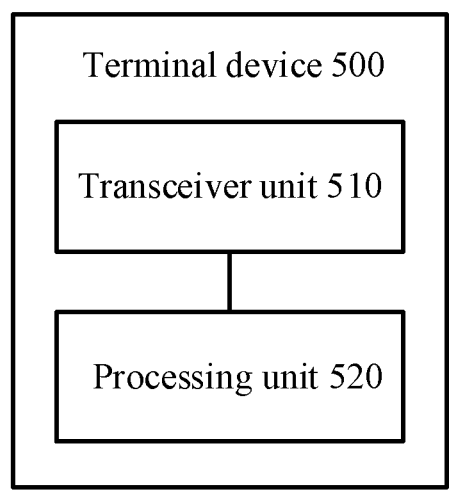
FIG. 5 is a schematic block diagram of a terminal device according to an implementation of the present disclosure.

As shown in FIG. 5, a terminal device 500 according to an implementation of the present disclosure includes a transceiver unit 510 and a processing unit 520.

Specifically, the transceiver unit 510 is configured to receive first configuration information sent by a network device, wherein the first configuration information includes multiple resource collections, the multiple resource collections are in one-to-one correspondence with multiple RNTIs, each of the multiple resource collections is used for indicating an available resource of a target channel, and available resources indicated by the multiple resource collections are different.

The transceiver unit 510 is further configured to receive target DCI sent by the network device. The processing unit 520 is configured to determine a resource to be used by the target channel in the first resource collection corresponding to a first RNTI if the target DCI is scrambled according to the first RNTI among the multiple RNTIs.

Optionally, as an implementation, the processing unit 520 is further configured to determine a target resource in the first resource collection as the resource to be used by the target channel according to indication information in the target DCI.

Optionally, as an implementation, the target channel is a PUSCH or PDSCH; and each resource collection is a resource allocation table.

Optionally, as an implementation, each resource collection includes a resource parameter of at least one available resource of the PUSCH or PDSCH, and the resource parameter of the first available resource among the at least one available resource includes at least one of the following parameters: a starting symbol of the first available resource, a length of the first available resource and a mapping type of the first available resource. Mapping types include a first mapping type and a second mapping type. The first mapping type is that a time-domain position of a DMRS is indicated relative to a starting point of a time slot, and the second mapping type is that a time-domain position of the DMRS is indicated relative to a starting point of a PUSCH or PDSCH.

Optionally, as an implementation, the target channel is a PUCCH, and each resource collection is a resource set.

Optionally, as an implementation, each resource collection includes a resource parameter of at least one available resource of the PUCCH, and the resource parameter of a second available resource among the at least one available resource includes at least one of the following parameters: a starting symbol, a quantity of symbols, a starting physical resource block (PRB), a PRB of a second hop, a quantity of PRBs, whether to perform frequency hopping, an index of an initial cyclic shift, an index of an orthogonal over code (OCC), and a length of the OCC of the second available resource.

Optionally, as an implementation, the first RNTI is a C-RNTI.

Optionally, as an implementation, the transceiver unit 510 is further configured to receive second configuration information sent by the network device before receiving the target DCI sent by the network device, wherein the second configuration information is used for indicating whether to monitor DCI scrambled with a second RNTI among the multiple RNTIs.

Optionally, as an implementation, the processing unit 520 is further configured to determine to monitor the DCI scrambled with the second RNTI according to the second configuration information, determine whether the target DCI is scrambled according to the first RNTI or the second RNTI, and determine a resource to be used by the target channel in the second resource collection corresponding to the second RNTI if the target DCI is scrambled according to the second RNTI.

Optionally, as an implementation, the processing unit 520 is further configured to determine not to monitor the DCI scrambled with the second RNTI according to the second configuration information, and determine the target DCI is scrambled according to the first RNTI.

Optionally, as an implementation, if the second configuration information is a first value, the second configuration information is used for indicating to monitor the DCI scrambled with the second RNTI; and if the second configuration information is a second value, the second configuration information is used for indicating not to monitor the DCI scrambled with the second RNTI.

It should be understood that the terminal device 500 according to the implementation of the present disclosure may correspondingly perform the method 200 in the implementation of the present disclosure, and the above operations and/or functions and other operations and/or functions of each unit in the terminal device 500 are respectively for realizing each corresponding process of the terminal device of the methods in FIG. 1 to FIG. 4, and will not be repeated here for the sake of brevity.

Therefore, the terminal device in the implementation of the present disclosure may receive different resource collections that are configured by the network device for DCI scrambled with different RNTIs respectively, so as to dynamically allocate different time-frequency domain resources according to different types of services without consuming DCI overhead, thereby optimizing resource allocation for eMBB and URLLC services respectively, reducing a transmission delay of a URLLC, improving resource utilization of the system, and better supporting one terminal device to run eMBB and URLLC services at the same time.

Figure 6:
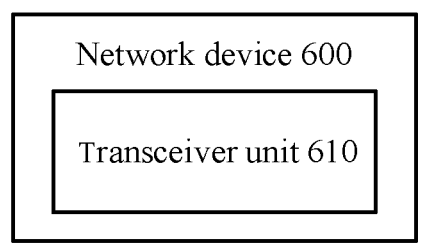
FIG. 6 is a schematic block diagram of a network device according to an implementation of the present disclosure.

As shown in FIG. 6, a network device 600 according to an implementation of the present disclosure includes: a transceiver unit 610.

Specifically, the transceiver unit 610 is configured to send first configuration information to a terminal device, wherein the first configuration information includes multiple resource collections which are in one-to-one correspondence with multiple RNTIs, each of the multiple resource collections is used for indicating an available resource of a target channel of the terminal device, and available resources indicated by the multiple resource collections are different.

The transceiver unit 610 is further configured to send target DCI to the terminal device, wherein if the target DCI is scrambled according to a first RNTI among the multiple RNTIs, the first RNTI is used for the terminal device to determine a resource to be used by the target channel in the first resource collection corresponding to the first RNTI.

Optionally, as an implementation, the target DCI includes indication information, the indication information is used for the terminal device to determine a target resource in the first resource collection as the resource to be used by the target channel.

Optionally, as an implementation, the target channel is a PUSCH or PDSCH, and each resource collection is a resource allocation table.

Optionally, as an implementation, each resource collection includes a resource parameter of at least one available resource of the PUSCH or PDSCH, and the resource parameter of a first available resource among the at least one available resource includes at least one of the following parameters: a starting symbol of the first available resource, a length of the first available resource and a mapping type of the first available resource. Mapping types include a first mapping type and a second mapping type. The first mapping type is that a time-domain position of a DMRS is indicated relative to a starting point of a time slot, and the second mapping type is that a time-domain position of the DMRS is indicated relative to a starting point of a PUSCH or PDSCH.

Optionally, as an implementation, the target channel is a PUCCH, and each resource collection is a resource set.

Optionally, as an implementation, each resource collection includes a resource parameter of at least one available resource of the PUCCH, and the resource parameter of a second available resource among the at least one available resource includes at least one of the following parameters: a starting symbol, a quantity of symbols, a starting physical resource block (PRB), a PRB of a second hop, a quantity of PRBs, whether to perform frequency hopping, an index of an initial cyclic shift, an index of an orthogonal over code (OCC), and a length of the OCC of the second available resource.

Optionally, as an implementation, the first RNTI is a C-RNTI.

Optionally, as an implementation, the transceiver unit 610 is further configured to send second configuration information to the terminal device before sending the target DCI to the terminal device, wherein the second configuration information indicates to the terminal device whether to monitor DCI scrambled with a second RNTI among the multiple RNTIs.

Optionally, as an implementation, the second configuration information indicates to the terminal device to monitor the DCI scrambled with the second RNTI, and if the target DCI is scrambled according to the second RNTI, the second RNTI is used for the terminal device to determine a resource to be used by the target channel in a second resource collection corresponding to the second RNTI.

Optionally, as an implementation, the second configuration information indicates to the terminal device not to monitor the DCI scrambled with the second RNTI, and the first RNTI is used for the terminal device to determine that the target DCI is scrambled according to the first RNTI.

Optionally, as an implementation, if the second configuration information is a first value, the second configuration information indicates to the terminal device to monitor the DCI scrambled with the second RNTI; and if the second configuration information is a second value, the second configuration information indicates to the terminal device not to monitor the DCI scrambled with the second RNTI.

It should be understood that the network device 600 according to the implementation of the present disclosure may correspondingly perform the method 300 in the implementation of the present disclosure, and the above and other operations and/or functions of each unit in the network device 600 are respectively for realizing each corresponding process of the network device in the methods in FIG. 1 to FIG. 4, which will not be repeated here for the sake of brevity.

Therefore, the network device in the implementation of the present disclosure may configure different resource collections for the terminal device according to DCI scrambled with different RNTIs respectively, so as to dynamically allocate different time-frequency domain resources according to different types of services without consuming DCI overhead, thereby optimizing resource allocation for eMBB and URLLC services respectively, reducing a transmission delay of a URLLC, improving resource utilization of the system, and better supporting one terminal device to run eMBB and URLLC services at the same time.

Figure 7:
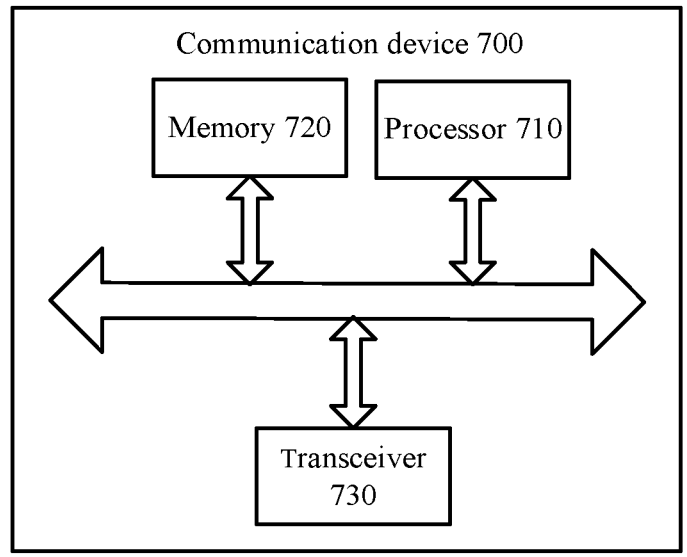
FIG. 7 is a schematic block diagram of a communication device according to an implementation of the present disclosure.

FIG. 7 is a schematic diagram of a structure of a communication device 700 according to an implementation of the present disclosure. The communication device 700 shown in FIG. 7 includes a processor 710. The processor 710 may call and run a computer program from a memory to perform the methods in the implementations of the present disclosure.

Optionally, as shown in FIG. 7, the communication device 700 may further include a memory 720. The processor 710 may call and run a computer program from the memory 720 to perform the method in the implementations of the present disclosure.

The memory 720 may be a separate device independent of the processor 710 or may be integrated in the processor 710.

Optionally, as shown in FIG. 7, the communication device 700 may further include a transceiver 730. The processor 710 may control the transceiver 730 to communicate with other devices. Specifically, the transceiver 730 may send information or data to other devices or receive information or data sent by other devices.

The transceiver 730 may include a transmitter and a receiver. The transceiver 730 may further include an antenna, and a quantity of antennas may be one or more.

Optionally, the communication device 700 may be specifically a network device of the implementations of the present disclosure, and the communication device 700 may implement the corresponding processes implemented by the network device in various methods of the implementations of the present disclosure, which will not be repeated here for brevity.

Optionally, the communication device 700 may be specifically a mobile terminal/terminal device of the implementations of the present disclosure, and the communication device 700 may implement the corresponding processes implemented by the mobile terminal/terminal device in the various methods of the implementations of the present disclosure, which will not be repeated here for brevity.

Figure 8:
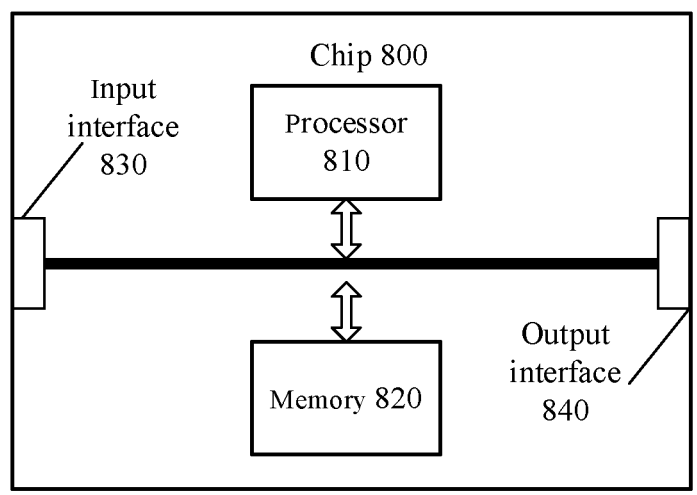
FIG. 8 is a schematic diagram of a structure of a chip according to an implementation of the present disclosure.

FIG. 8 is a schematic diagram of a structure of a chip according to an implementation of the present disclosure. The chip 800 shown in FIG. 8 includes a processor 810. The processor 810 may call and run a computer program from a memory to perform the methods in the implementations of the present disclosure.

Optionally, as shown in FIG. 8, the chip 800 may further include a memory 820. The processor 810 may call and run a computer program from the memory 820 to perform the methods in the implementations of the present disclosure.

The memory 820 may be a separate device independent of the processor 810 or may be integrated in the processor 810.

Optionally, the chip 800 may further include an input interface 830. The processor 810 may control the input interface 830 to communicate with other devices or chips. Specifically, the processor 810 may acquire information or data sent by other devices or chips.

Optionally, the chip 800 may further include an output interface 840. The processor 810 may control the output interface 840 to communicate with other devices or chips. Specifically, the processor 710 may output information or data to other devices or chips.

Optionally, the chip may be applied in a network device of the implementations of the present disclosure, and the chip may implement the corresponding processes implemented by the network device in various methods of the implementations of the present disclosure, which will not be repeated here for brevity.

Optionally, the chip may be applied in a mobile terminal/terminal device of the implementations of the present disclosure, and the chip may implement the corresponding processes implemented by the mobile terminal/terminal device in the various methods of the implementations of the present disclosure, which will not be repeated here for brevity.

It should be understood that the chip mentioned in the implementation of the present disclosure may be referred to as a system-level chip, a system chip, a chip system or a system-on-chip, etc.

Figure 9:
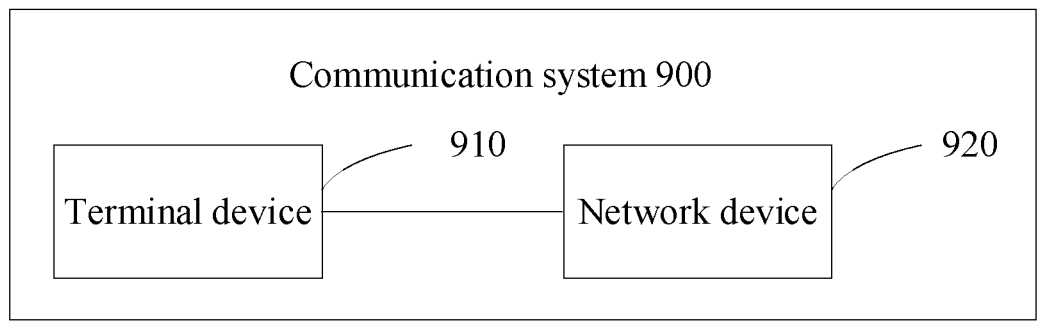
FIG. 9 is a schematic block diagram of a communication system according to an implementation of the present disclosure.

FIG. 9 is a schematic block diagram of a communication system 900 according to an implementation of the present disclosure. As shown in FIG. 9, the communication system 900 may include a terminal device 910 and a network device 920.

Herein, the terminal device 910 may be configured to implement the corresponding functions implemented by the terminal device in the above-mentioned method, and the network device 920 may be configured to implement the corresponding functions implemented by the network device in the above-mentioned method, which will not be repeated here for brevity.

It should be understood that, the processor in the implementation of the present disclosure may be an integrated circuit chip having a signal processing capability. In an implementation process, steps of the foregoing method implementations may be implemented by using an integrated logic circuit of hardware in the processor or instructions in a form of software. The processor may be a general purpose processor, a digital signal processor (DSP), an application specific integrated circuit (ASIC), a field programmable gate array (FPGA) or other programmable logic device, a discrete gate or a transistor logic device, or a discrete hardware component. The processor may implement or perform methods, steps and logical block diagrams disclosed in the implementations of the present disclosure. The general purpose processor may be a microprocessor, or the processor may be any conventional processor or the like. The steps of the methods disclosed with reference to the implementations of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads information in the memory and performs the acts of the above methods in combination with its hardware.

It may be understood that, the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through illustrative but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory in the systems and methods described in the document is intended to include but not limited to these and any memory of other proper types.

It should be understood that, the foregoing memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present disclosure are intended to include, but are not limited to, these and any other suitable types of memories.

An implementation of the present disclosure further provides a computer readable storage medium configured to store a computer program.

Optionally, the computer readable storage medium may be applied in a network device of the implementations of the present disclosure, and the computer program enables the computer to perform the corresponding processes implemented by the network device in various methods of the implementations of the present disclosure, which will not be repeated here for brevity.

Optionally, the computer readable storage medium may be applied in a mobile terminal/terminal device of the implementations of the present disclosure, and the computer program enables the computer to perform the corresponding processes implemented by the mobile terminal/terminal device in various methods of the implementations of the present disclosure, which will not be repeated here for brevity.

An implementation of the present disclosure further provides a computer program product including computer program instructions.

Optionally, the computer program product may be applied in a network device of the implementations of the present disclosure, and the computer program instructions enable the computer to perform the corresponding processes implemented by the network device in various methods of the implementations of the present disclosure, which will not be repeated here for brevity.

Optionally, the computer program product may be applied in a mobile terminal/terminal device of the implementations of the present disclosure, and the computer program instructions enable the computer to perform the corresponding processes implemented by the mobile terminal/terminal device in various methods according to the implementations of the present disclosure, which will not be repeated here for brevity.

An implementation of the present disclosure further provides a computer program.

Optionally, the computer program may be applied in a network device of the implementations of the present disclosure. When the computer program is run on a computer, the computer is enabled to perform the corresponding processes implemented by the network device in various methods of the implementations of the present disclosure, which will not be repeated here for brevity.

Optionally, the computer program may be applied in a mobile terminal/terminal device of the implementation of the present disclosure. When the computer program is run on a computer, the computer is enabled to perform the corresponding processes implemented by the mobile terminal/ terminal device in various methods of the implementations of the present disclosure, which will not be repeated here for brevity.

Those of ordinary skill in the art will recognize that the example elements and algorithm acts described in combination with the implementations disclosed in the document may be implemented in electronic hardware, or a combination of computer software and electronic hardware. Whether these functions are implemented in hardware or software depends on a specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, division of the units is only a logical function division, and there may be other division modes in actual implementation, for example, multiple units or components may be combined or integrated into another system, or some features may be ignored or not executed. On the other hand, mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the solution of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the methods described in various implementations of the present disclosure. The foregoing storage medium includes: any medium that can store program code, such as a USB flash drive, a removable hard disk, a read-only memory (ROM), a random access memory (RAM), a magnetic disk, or an optical disc.

What are described above are merely specific implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What we claim is:

1. A resource allocation method, comprising:
    receiving first configuration information sent by a network device, wherein the first configuration information comprises a plurality of resource collections, the plurality of resource collections are in one-to-one correspondence with a plurality of Radio Network Temporary Identities (RNTIs), each of the plurality of resource collections is used for indicating an available resource of a target channel, and available resources indicated by the plurality of resource collections are different;
    receiving target downlink control information (DCI) sent by the network device; and
    determining a resource to be used by the target channel in a first resource collection corresponding to a first RNTI if the target DCI is scrambled with to the first RNTI among the plurality of RNTIs, and a resource to be used by the target channel in a second resource collection corresponding to a second RNTI if the target DCI is scrambled with the second RNTI among the plurality of RNTIs.

2. The method according to claim 1, wherein determining the resource to be used by the target channel in the first resource collection corresponding to the first RNTI comprises:
    determining a target resource in the first resource collection as the resource to be used by the target channel according to indication information in the target DCI.

3. The method according to claim 1, wherein the target channel is a physical uplink shared channel (PUSCH) or a physical downlink shared channel (PDSCH); and each resource collection is a resource allocation table.

4. The method according to claim 3, wherein each resource collection comprises a resource parameter of at least one available resource of the PUSCH or PDSCH, and the resource parameter of a first available resource among the at least one available resource comprises at least one of the following parameters: a starting symbol of the first available resource, a length of the first available resource and a mapping type of the first available resource, wherein mapping types comprise a first mapping type and a second mapping type, the first mapping type is that a time-domain position of a demodulation reference signal (DMRS) is indicated relative to a starting point of a time slot, and the second mapping type is that a time-domain position of the DMRS is indicated relative to a starting point of the PUSCH or PDSCH.

5. The method according to claim 1, wherein the target channel is a physical uplink control channel (PUCCH), and each resource collection is a resource set.

6. The method according to claim 5, wherein each resource collection comprises a resource parameter of at least one available resource of the PUCCH, and the resource parameter of a second available resource among the at least one available resource comprises at least one of the following parameters: a starting symbol, a quantity of symbols, a starting physical resource block (PRB), a PRB of a second hop, a quantity of PRBs, whether to perform frequency hopping, an index of an initial cyclic shift, an index of an orthogonal over code (OCC), and a length of the OCC of the second available resource.

7. The method according to claim 1, wherein before receiving the target downlink control information (DCI) sent by the network device, the method further comprises:
- receiving second configuration information sent by the network device, wherein the second configuration information is used for indicating whether to monitor DCI scrambled with the second RNTI among the plurality of RNTIs.

8. The method according to claim 7, further comprising:
- determining to monitor the DCI scrambled with the second RNTI according to the second configuration information;
- determining the target DCI is scrambled with the first RNTI or the second RNTI; and
- determining the resource to be used by the target channel in the second resource collection corresponding to the second RNTI if the target DCI is scrambled with the second RNTI.

9. The method according to claim 7, further comprising:
- determining not to monitor the DCI scrambled with the second RNTI according to the second configuration information, and determining that the target DCI is scrambled with the first RNTI.

10. The method according to claim 7, wherein if the second configuration information is a first value, the second configuration information is used for indicating to monitor the DCI scrambled with the second RNTI; and
- if the second configuration information is a second value, the second configuration information is used for indicating not to monitor the DCI scrambled with the second RNTI.

11. A terminal device, comprising a processor and a transceiver, wherein
- the transceiver is configured to receive first configuration information sent by a network device, wherein the first configuration information comprises a plurality of resource collections, the plurality of resource collections are in one-to-one correspondence with a plurality of Radio Network Temporary Identities (RNTIs), each of the plurality of resource collections is used for indicating an available resource of a target channel, and available resources indicated by the plurality of resource collections are different;
- the transceiver is further configured to receive target downlink control information (DCI) sent by the network device; and
- the processor is configured to determine a resource to be used by the target channel in a first resource collection corresponding to a first RNTI if the target DCI is scrambled with the first RNTI among the plurality of RNTIs, and determine a resource to be used by the target channel in a second resource collection corresponding to a second RNTI if the target DCI is scrambled with the second RNTI among the plurality of RNTIs.

12. The terminal device according to claim 11, wherein the processor is further configured to:
- determine a target resource in the first resource collection as the resource to be used by the target channel according to indication information in the target DCI.

13. The terminal device according to claim 11, wherein the target channel is a physical uplink shared channel (PUSCH) or a physical downlink shared channel (PDSCH); and each resource collection is a resource allocation table.

14. The terminal device according to claim 13, wherein each resource collection comprises a resource parameter of at least one available resource of the PUSCH or PDSCH, and the resource parameter of a first available resource among the at least one available resource comprises at least one of the following parameters: a starting symbol of the first available resource, a length of the first available resource and a mapping type of the first available resource, wherein mapping types comprise a first mapping type and a second mapping type, the first mapping type is that a time-domain position of a demodulation reference signal (DMRS) is indicated relative to a starting point of a time slot, and the second mapping type is that a time-domain position of the DMRS is indicated relative to a starting point of the PUSCH or PDSCH.

15. The terminal device according to claim 11, wherein the target channel is a physical uplink control channel (PUCCH), and each resource collection is a resource set.

16. The terminal device according to claim 15, wherein each resource collection comprises a resource parameter of at least one available resource of the PUCCH, and the resource parameter of a second available resource among the at least one available resource comprises at least one of the following parameters: a starting symbol, a quantity of symbols, a starting physical resource block (PRB), a PRB of a second hop, a quantity of PRBs, whether to perform frequency hopping, an index of an initial cyclic shift, an index of an orthogonal cover code (OCC), and a length of the OCC of the second available resource.

17. The terminal device according to claim 11, wherein the transceiver is further configured to:
- receive second configuration information sent by the network device before receiving the target DCI sent by the network device, wherein the second configuration information is used for indicating whether to monitor DCI scrambled with the second RNTI among the plurality of RNTIs.

18. The terminal device according to claim 17, wherein the processor is further configured to:
- determine to monitor the DCI scrambled with the second RNTI according to the second configuration information;
- determine the target DCI is scrambled with the first RNTI or the second RNTI; and
- determine the resource to be used by the target channel in the second resource collection corresponding to the second RNTI if the target DCI is scrambled with the second RNTI.

19. The terminal device according to claim 17, wherein if the second configuration information is a first value, the second configuration information is used for indicating to monitor the DCI scrambled with the second RNTI; and
- if the second configuration information is a second value, the second configuration information is used for indicating not to monitor the DCI scrambled with the second RNTI.

20. A non-transitory computer readable storage medium for storing a computer program, wherein the computer program causes a computer to perform the method according to claim 1.

* * * * *